(12) United States Patent
Horie et al.

(10) Patent No.: US 8,964,429 B2
(45) Date of Patent: Feb. 24, 2015

(54) INVERTER DEVICE AND ELECTRIC POWER TOOL

(75) Inventors: Yuki Horie, Hitachinaka (JP); Shinji Watanabe, Hitachinaka (JP); Yasushi Nakano, Hitachinaka (JP); Yukihiro Shima, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 13/984,883

(22) PCT Filed: Mar. 14, 2012

(86) PCT No.: PCT/JP2012/001799
§ 371 (c)(1),
(2), (4) Date: Sep. 5, 2013

(87) PCT Pub. No.: WO2012/124332
PCT Pub. Date: Sep. 20, 2012

(65) Prior Publication Data
US 2014/0042839 A1 Feb. 13, 2014

(30) Foreign Application Priority Data

Mar. 14, 2011 (JP) ................................ 2011-055054
Mar. 14, 2011 (JP) ................................ 2011-055055

(51) Int. Cl.
*H02H 7/122* (2006.01)
*H02P 23/00* (2006.01)
*H02M 1/32* (2007.01)
*H02M 7/5387* (2007.01)
*H02K 7/14* (2006.01)
*H02M 7/44* (2006.01)

(52) U.S. Cl.
CPC ................ *H02P 23/00* (2013.01); *H02M 1/32* (2013.01); *H02M 7/53871* (2013.01); *H02K 7/145* (2013.01); *H02M 7/44* (2013.01)
USPC ......................... 363/55; 363/56.01; 363/56.02

(58) Field of Classification Search
USPC ................. 363/15, 16, 34, 50, 53, 55, 56.01, 363/56.02, 131, 132
See application file for complete search history.

(56) References Cited

U.S. PATENT DOCUMENTS

| 5,568,347 | A | 10/1996 | Shirai et al. |
| 5,625,539 | A * | 4/1997 | Nakata et al. ................... 363/17 |
| 7,339,287 | B2 * | 3/2008 | Jepsen et al. ................... 307/82 |
| 7,886,509 | B2 | 2/2011 | Itoh et al. |

(Continued)

FOREIGN PATENT DOCUMENTS

| EP | 2012426 A2 | 1/2009 |
| JP | 08-080058 A | 6/1996 |

(Continued)

OTHER PUBLICATIONS

International Search Report for application PCT/JP2012/001799 (Sep. 17, 2012).

(Continued)

*Primary Examiner* — Emily P Pham
(74) *Attorney, Agent, or Firm* — Kilpatrick Townsend & Stockton LLP (57) ABSTRACT

An inverter device includes: an inverter circuit configured to perform ON/OFF operations with a preset duty cycle to convert a DC power into an AC power and output the AC power to an AC motor; and a controller configured to change a duty cycle of the ON/OFF operations.

14 Claims, 6 Drawing Sheets

(56) References Cited

U.S. PATENT DOCUMENTS

| | | | |
|---|---|---|---|
| 2002/0162033 A1 | 10/2002 | Maxwell et al. | |
| 2007/0133241 A1* | 6/2007 | Mumtaz et al. | 363/131 |
| 2008/0110148 A1 | 5/2008 | Itoh et al. | |
| 2008/0218111 A1* | 9/2008 | Okamura | 318/453 |
| 2008/0266922 A1* | 10/2008 | Mumtaz et al. | 363/131 |
| 2012/0024552 A1* | 2/2012 | Kawano et al. | 173/2 |

FOREIGN PATENT DOCUMENTS

| | | |
|---|---|---|
| JP | 09-140151 A | 5/1997 |
| JP | 2001-185394 A | 7/2001 |
| JP | 2004-129378 A | 4/2004 |
| JP | 2004-343972 A | 12/2004 |
| JP | 2008-118941 A | 5/2008 |
| JP | 2008-148366 A | 6/2008 |
| JP | 2009-017690 A | 1/2009 |
| JP | 2009-278832 A | 11/2009 |
| JP | 2010-183765 A | 8/2010 |

OTHER PUBLICATIONS

International Report on Patentability for application PCT/JP2012/001799 (Sep. 26, 2013).

Japan Patent Office office action for patent application JP2011-055055 (Sep. 22, 2014).

Japan Patent Office office action for patent application JP2011-055054 (Sep. 18, 2014).

* cited by examiner

|     | FET161 | FET162 | FET163 | FET164 |
|-----|--------|--------|--------|--------|
| (1) | ON     | OFF    | ON     | OFF    |
| (2) | OFF    | OFF    | OFF    | OFF    |
| (3) | OFF    | ON     | OFF    | ON     |
| (4) | OFF    | OFF    | OFF    | OFF    |

(d)

| ANGLE     | 90    | 150    |
|-----------|-------|--------|
| ON-PERIOD | 0.005 | 0.0083 |

# INVERTER DEVICE AND ELECTRIC POWER TOOL

TECHNICAL FIELD

The invention relates to an inverter device and an electric power tool.

BACKGROUND ART

An electric device provided with an inverter circuit is well-known. Japanese Patent Application Publication No. 2009-278832 provides such the electric device that boosts AC voltage supplied from a commercial power source, rectifying/smoothing the boosted AC voltage into DC voltage, converts the DC voltage into predetermined AC voltage using the inverter circuit, and outputs the predetermined AC voltage to an AC motor provided in the electric device.

DISCLOSURE OF INVENTION

Solution to Problem

In a case where the electric device is a lawn mower, for example, grasses are sometimes stuck in a mowing section, and an overload can be applied to the AC motor. In such a case, the AC motor is locked, thereby interrupting a mowing work.

In view of the foregoing, it is an object of the invention to provide an inverter device and an electric power tool capable of dealing with an overload temporally applied to a motor.

In order to attain the above and other objects, the invention provides an inverter device including: an inverter circuit configured to perform ON/OFF operations with a preset duty cycle to convert a DC power into an AC power and output the AC power to an AC motor; and a controller configured to change a duty cycle of the ON/OFF operations.

It is preferable that the duty cycle indicates an ON period in one cycle of the ON/OFF operations.

It is preferable that the inverter device further includes a load detecting unit configured to detect a load applied to the motor. The controller changes the duty cycle based on the load detected by the load detecting unit.

It is preferable that the controller increases the duty cycle when the load detected by the load detecting unit is larger than a preset value.

It is preferable that the controller increases the duty cycle when the load detected by the load detecting unit is larger than the preset value over a first period.

It is preferable that the controller decreases the duty cycle when a second period has elapsed since the controller increased the duty cycle.

It is preferable that the controller decreases the duty cycle when the load detected by the load detecting unit drops below than the preset value before the second period has elapsed since the controller increased the duty cycle.

Another aspect of the present invention provides an electrical power tool including: the inverter device; and the AC motor.

Another aspect of the present invention provides an inverter device including: a switching element configured to perform ON/OFF operations to convert a first DC voltage into a first AC voltage; a rectifying/smoothing circuit configured to convert the first AC voltage into a second DC voltage; an inverter circuit configured to convert the second DC voltage into a second AC voltage; a first current detecting unit configured to detect a current flowing into the switching element; and a first stopping unit configured to stop the ON/OFF operations of the switching element based on the current detected by the first current detecting unit.

It is preferable that the inverter device further includes a controller configured to control the switching element and the inverter circuit. The first stopping unit stops the ON/OFF operations of the switching element independently of the controller.

It is preferable that the inverter device further includes: a second current detecting unit configured to detect a current flowing into the inverter circuit; and a second stopping unit configured to stop the ON/OFF operations of the switching element based on the current detected by the second current detecting unit.

It is preferable that the first stopping unit is configured from an analogue circuit and the second stopping unit is the controller.

It is preferable that the first stopping unit stops the ON/OFF operations of the switching element when the current detected by the first current detecting unit exceeds a preset value, and cancels the stoppage of the ON/OFF operations of the switching element when the current detected by the first current detecting unit drops below the preset value after the stoppage of the ON/OFF operations of the switching element.

It is preferable that the switching element is configured from an FET having a gate, a source, and a drain, the FET performing the ON/OFF operations in accordance with a gate signal inputted into the gate. The first stopping unit forcibly cuts out the gate signal when the current detected by the first current detecting unit exceeds the preset value.

It is preferable that the first current detecting unit has a resistor connected to one of the source and the drain. The first stopping unit includes: an amplifier circuit configured to amplify a voltage difference between both ends of the resistor; and a comparison circuit configured to compare the amplified voltage difference with a preset voltage. The comparison circuit outputs a block-out signal to the gate to stop the ON/OFF operations of the FET when the amplified voltage difference exceeds the preset voltage.

Another aspect of the present invention provides an electrical power tool including: the inverter device; and a motor driven with a power supplied from the inverter circuit.

Advantageous Effects of Invention

According to the inverter device and the electric power tool, it becomes possible to deal with an overload temporally applied to a motor.

Specially, the inverter device according to the present invention is suitable to a lawn mower and a hedge trimmer etc. that cut grass. If the tool cuts thick grass, load applied to the tool becomes larger temporarily. In such case, it becomes possible to cut the thick grass by temporarily increasing output of the tool without stopping the cutting operation.

Further, if the inverter device according to the present invention is used in a drill, the inverter device is more effective when loosening a rusting screw, for example. In such case, it becomes possible to fasten the rusting screw by temporarily increasing output of the tool at the beginning period of the fastening operation without stopping the fastening operation.

REFERENCE SIGNS LIST 1, 10 Inverter Device
132 FET
14 Rectifying/smoothing Circuit
16 Inverter Circuit
17 Current Detection Resistor
19 Controller
20 FET protecting unit
201 Resistor
3 Electric Power Tool

BEST MODE FOR CARRYING OUT THE INVENTION

An inverter device 1 according to a first embodiment of the present invention will be described while referring to FIGS. 1 to 3.

Figure 1:
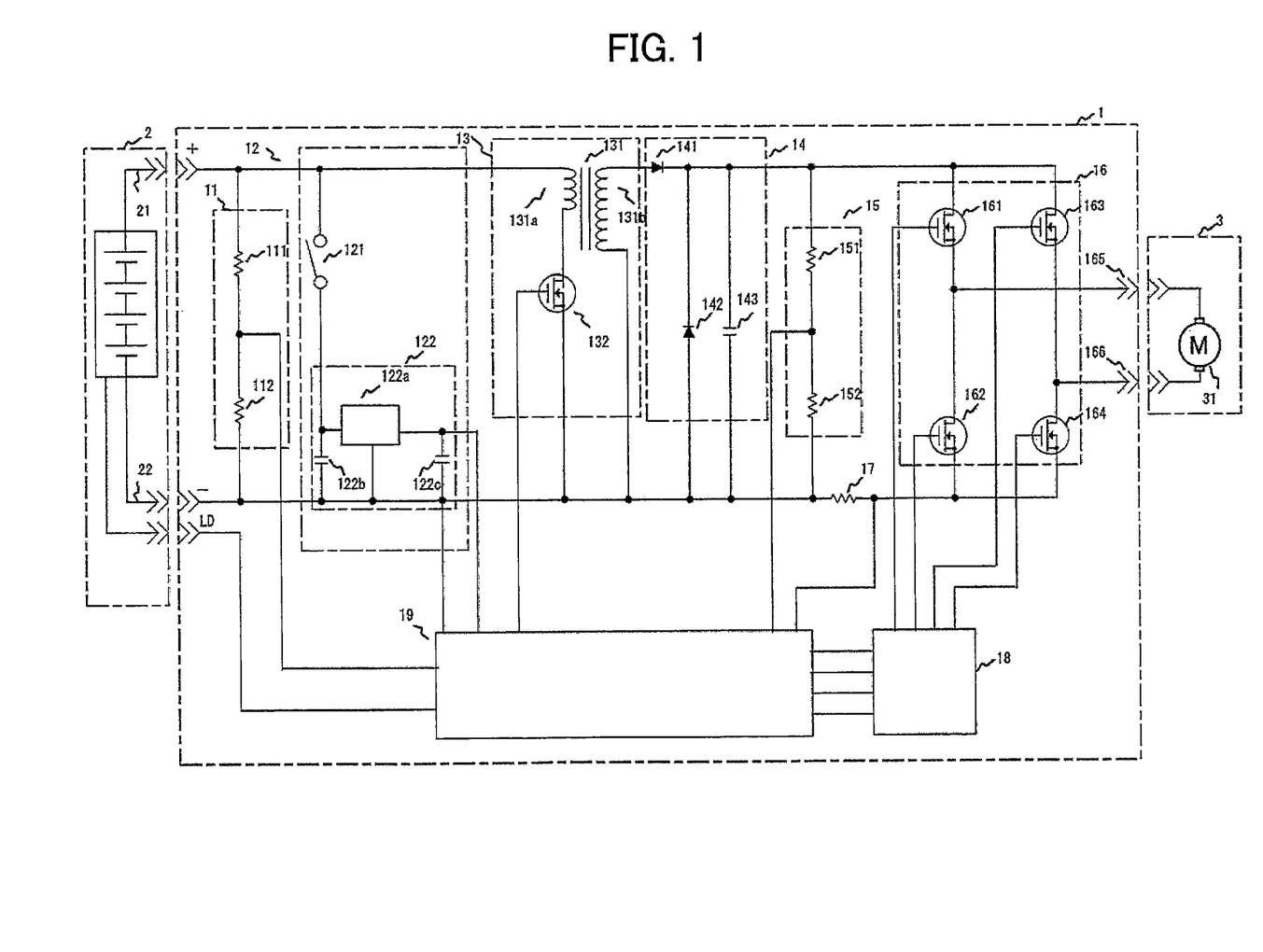
FIG. 1 is a circuit diagram of an inverter device according to a first embodiment of the present invention.

FIG. 1 is a circuit diagram of the inverter device 1. The inverter device 1 is connected between a battery pack 2 and an electric power tool 3 to convert a DC power supplied from the battery pack 2 into an AC power and outputs the AC power to an AC motor 31 provided in the electric power tool 3. When an operator operates a trigger switch 32 provided in the electric power tool 3, the inverter device 1 converts DC power supplied from the battery pack 2 to AC power and supplies this AC power to the AC motor 31 of the electric power tool 3.

While the inverter device 1, electric power tool 3, and battery pack 2 are detachably connected to one another, the following description assumes that these components are connected. Further, a lawn mower is adopted as the electric power tool 3 in the present embodiment. However, another power tool, such as an electric power drill, may be adapted as the electric power tool 3 instead of the lawn mower.

The inverter device 1 includes a battery voltage detection unit 11, a power supply unit 12, a booster circuit 13, a rectifying/smoothing circuit 14, a boost voltage detection unit 15, an inverter circuit 16, a current detection resistor (the load detecting unit of the present invention) 17, a PWM signal output unit 18, and a controller 19.

The battery voltage detection unit 11 includes battery voltage detection resistors 111 and 112. The battery voltage detection resistors 111 and 112 are connected in series between a plus terminal 21 and a minus terminal 22 of the battery pack 2 to output a divided voltage of the battery voltage of the battery pack 2 by the battery voltage detection resistors 111 and 112 to the controller 19. Note that the battery pack 2 has four 3.6-V lithium battery cells connected in series for outputting a rated voltage of 14.4 V.

The power supply unit 12 includes a power switch 121 and a constant-voltage circuit 122 connected in series between the plus terminal 21 of the battery pack 2 and the controller 19. The constant-voltage circuit 122 includes a three-terminal regulator 122a, and oscillation-prevention capacitors 122b and 122c.

When an operator turns on the power switch 121, the constant-voltage circuit 122 converts the voltage supplied from the battery pack 2 into a prescribed DC voltage (5 V, for example) and supplies this voltage to the controller 19 as drive voltage. When the operator switches off the power switch 121, the entire inverter device 1 is turned off because the drive voltage is no longer supplied to the controller 19.

The booster circuit 13 is configured of a transformer 131, and a field effect transistor (FET) 132. The transformer 131 includes a primary winding 131a, and a secondary winding 131b. The primary winding 131a is connected between the plus terminal 21 and minus terminal 22 of the battery pack 2. The FET 132 is provided between the primary winding 131a of the transformer 131 and the minus terminal 22 of the battery pack 2.

The controller 19 inputs a first PWM signal into the gate of the FET 132 for switching the FET 132 on and off. Through on/off switching of the FET 132, the DC power supplied from the battery pack 2 to the primary winding 131a of the transformer 131 is converted into AC power. The AC voltage of this AC power is stepped up based on the ratio of the number of turns in the secondary winding 131b to the number of turns in the primary winding 131a, and is outputted from the secondary winding 131b.

The rectifying/smoothing circuit 14 is configured of rectifying diodes 141 and 142, and a smoothing capacitor 143. Through this configuration, the rectifying/smoothing circuit 14 converts the AC voltage stepped up by the transformer 131 to DC voltage (141 V, for example).

The boost voltage detection unit 15 includes resistors 151 and 152 connected in series to output, to the controller 19, a divided voltage of the DC voltage outputted from the rectifying/smoothing circuit 14 (the voltage at the smoothing capacitor 143; 141 V, for example) by the resistors 151 and 152.

The inverter circuit 16 is configured of four FETs 161-164. The FETs 161 and 162 are connected in series, and the FETs 163 and 164, with both pairs of FETs being connected to the smoothing capacitor 143 in parallel. More specifically, the drain of the FET 161 is connected to the cathodes of the rectifying diodes 141 and 142, while the source of the FET 161 is connected to the drain of the FET 162. Similarly, the drain of the FET 163 is connected to the cathodes of the rectifying diodes 141 and 142, while the source of the FET 163 is connected to the drain of the FET 164.

The inverter circuit 16 also includes output terminals 165 and 166 that are connected to the AC motor 31 of the electric power tool 3. The source of the FET 161 and the drain of the FET 162 are connected to the output terminal 165, while the source of the FET 163 and the drain of the FET 164 are connected to the output terminal 166. The PWM signal output unit 18 outputs second PWM signals to the gates of the FETs 161-164 for switching the FETs 161-164 on and off. Through on/off switching of the FETs 161-164, the inverter circuit 16 converts the DC power outputted from the rectifying/smoothing circuit 14 into AC power and supplies this AC power to the electric power tool 3 (the AC motor 31).

The current detection resistor 17 is connected between the source of the FET 162 (FET 164) and the minus terminal 22 of the battery pack 2. The terminal of the current detection resistor 17 on the high-voltage side is also connected to the controller 19. With this configuration, the controller 19 can determine the current flowing to the AC motor 31 based on the voltage detected by the current detection resistor 17.

The controller 19 outputs the first PWM signal to the gate of the FET 132 based on the boosted voltage detected by the boost voltage detection unit 15 in order that the AC voltage outputted from the secondary side of the transformer 131 has the desired effective voltage (141 V, for example). The controller 19 also outputs the second PWM signals to the gates of the FETs 161-164 via the PWM signal output unit 18 in order that the AC voltage outputted to the AC motor 31 has the desired effective voltage (100 V, for example).

In the preferred embodiment, the FETs 161 and 164 are treated as one set (hereinafter referred to as the "first set"), while the FETs 162 and 163 are treated as another set (hereinafter referred to as the "second set"), and the controller 19 normally outputs the second PWM signals for alternately turning on and off the first and second sets at a duty cycle of 50% (FIG. 2(*a*)). In other words, the controller 19 controls the signal outputted to the FET 132 based on feedback information of the boosted voltage detected by the boost voltage detection unit 15 so that a target voltage is detected by the boost voltage detection unit 15.

The controller 19 also determines whether over-discharge has occurred in the battery pack 2 based on the battery voltage detected by the battery voltage detection unit 11. More specifically, when the battery voltage detected by the battery voltage detection unit 11 is smaller than a preset over-discharge voltage, the controller 19 determines that over-discharge has occurred in the battery pack 2 and outputs the first and second PWM signals for halting the electric power supply to the AC motor 31. That is, the controller 19 halts output of the first and second PWM signals.

The battery pack 2 is further provided with a built-in protection circuit or microcomputer and possesses a function for self-detecting over-discharge and for outputting an over-discharge signal to the controller 19. When the controller 19 receives an over-discharge signal from the battery pack 2 via a signal terminal LD, the controller 19 outputs first and second PWM signals in order to halt output to the AC motor 31. That is, the controller 19 halts output of the first and second PWM signals. This construction can prevent such over-discharge from shortening the lifespan of the battery pack 2.

Here, in the electric power tool 3 that is a lawn mower, grasses are sometimes stuck in a mowing section, and an overload can be applied to the AC motor 31. In such a case, the AC motor 31 is locked, thereby interrupting a mowing work.

Hence, in the inverter device 1 according to the present embodiment, the controller 19 changes ON periods of the first set and the second set, that is, conduction angle (duty cycle) in accordance with a current detected by the current detection resistor 17.

Specifically, if the current detected by the current detection resistor 17 is larger than a preset value (5.8 A in the present embodiment), the second PWM signal for increasing the conduction angle (duty cycle) is outputted to the gates of the FETs 161-164.

Figure 2:
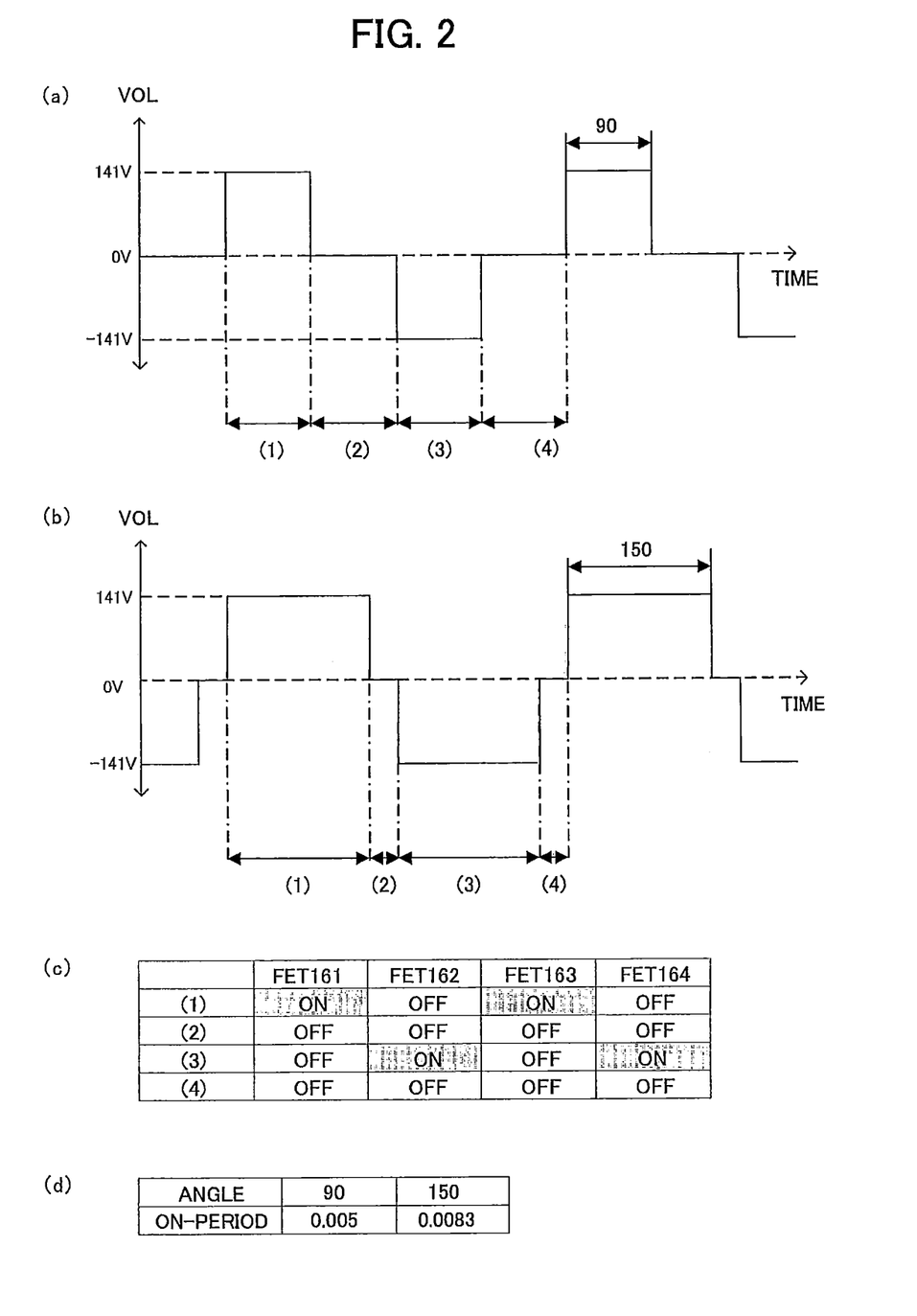
FIG. 2 is an explanation diagram of a conduction angle control according to the first embodiment of the invention.

In a normal time, as shown in FIG. 2(*a*), the ON periods of the first set and the second set are controlled with a conduction angle of 90 degrees. As shown in FIG. 2(*c*), a period (1) of FIG. 2(*a*) is a period in which only the first set is ON, a period (3) of FIG. 2(*a*) is a period in which only the second set is ON, and periods (2) and (4) of FIG. 2(*a*) are periods in which the both sets are OFF.

On the other hand, in the present embodiment, if the current detected by the current detection resistor 17 is larger than the preset value, the conduction angle is increased to 150 degrees. Specifically, as shown in FIG. 2(*b*), the period (1) in which only the first set is ON and the period (3) in which only the second set is ON are increased, and the periods (2) and (4) in which the both sets are OFF are decreased, in one cycle.

As shown in FIG. 2(*d*), considering a case in which AC power with frequency of 50 Hz (cycle 20 ms) is outputted, the ON period of the first set and the second set is 5 ms if the conduction angle is set to 90 degrees, and increases to 8.3 ms if the conduction angle is 150 degrees.

For example, in a case where grasses are stuck in a mowing section of the power tool 3 and the AC motor 31 has overload, electric power that is increased temporarily is supplied to the AC motor 31. Thus, stuck grasses can be removed from the mowing section, which prevents a situation where the AC motor 31 is locked and mowing work is interrupted.

Further, the current detected by the current detection resistor 17 sometimes increases temporarily due to noises or the like. However, if the conduction angle (duty cycle) is increased in such a case, electric power is wasted.

Thus, in the present embodiment, the conduction angle (duty cycle) is increased if the current detected by the current detection resistor 17 is larger than or equal to the above-mentioned preset value over a first period (2 sec in the present embodiment). This can enable the user to recognize precisely that the AC motor 31 is in a locked state or in a state close to the locked state. This can prevent a situation in which the conduction angle (duty cycle) is increased in a state other than the locked state or the state close to the locked state and electric power is wasted.

A case can be conceived in which stuck grasses cannot be removed from the mowing section even if the conduction angle (duty cycle) is increased. In such a case, if large electric power is supplied to the AC motor 31 for a long period, there is a possibility that the AC motor 31 is damaged.

Hence, in the present embodiment, the conduction angle (duty cycle) is reduced when a second period (3 sec in the present embodiment) has elapsed since the conduction angle (duty cycle) was increased. This can prevent a situation in which large electric power is supplied and the AC motor 31 is damaged.

Further, in the present embodiment, if the load detected by the current detection resistor 17 drops below the above-mentioned preset value before the second predetermined period elapses, the conduction angle (duty cycle) is reduced at that time point. This can shorten a period during which large electric power is supplied to the AC motor 31, thereby preventing damage of the AC motor 31 more suitably.

Next, operations of the controller 19 will be described while referring to the flowchart of FIG. 3.

Figure 3:
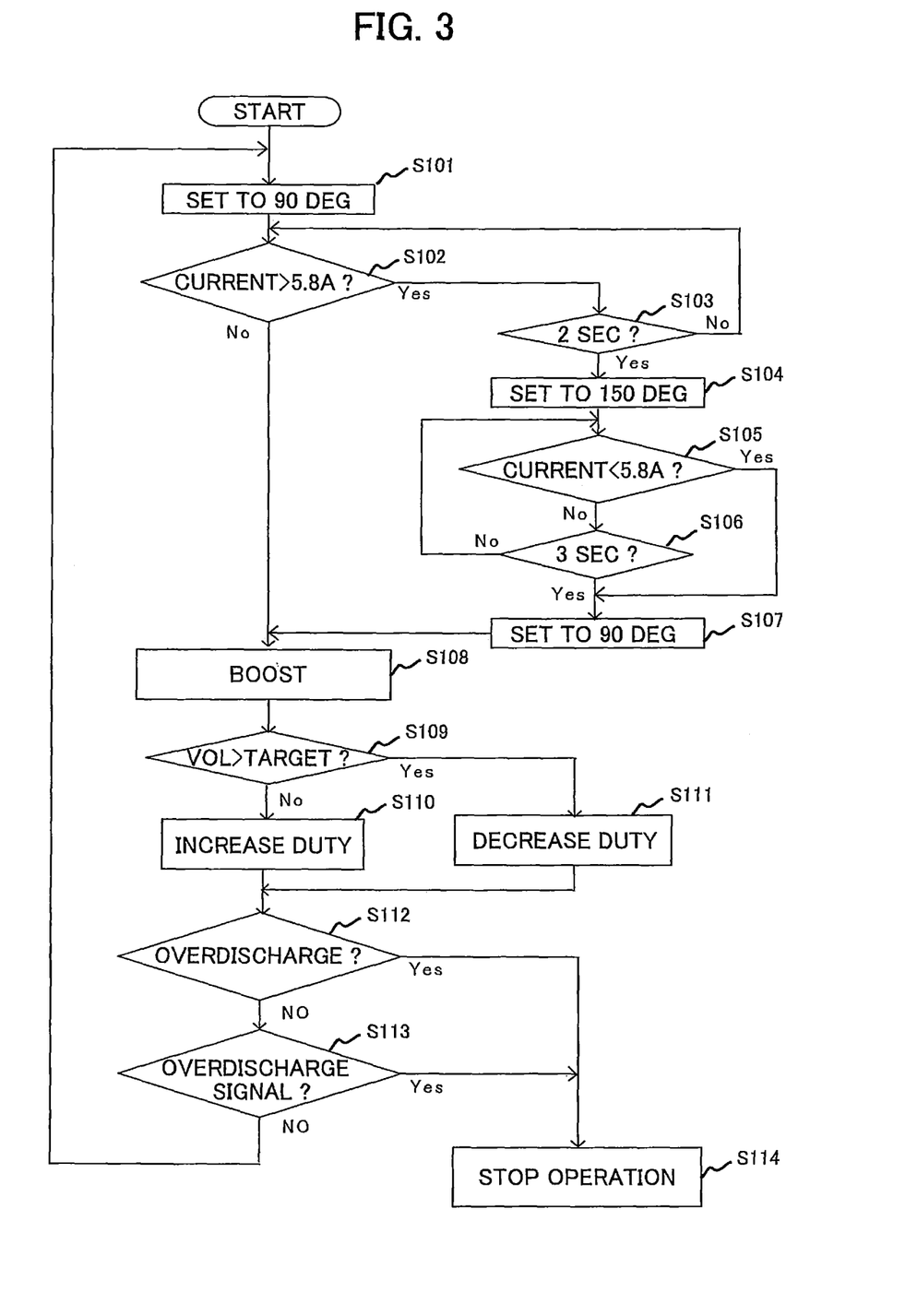
FIG. 3 is a flowchart of a conduction angle control according to the first embodiment of the invention.

The flowchart of FIG. 3 is started when the power switch 121 is turned on in a state where the battery pack 2 is mounted on the inverter device 1, or when the battery pack 2 is mounted onto the inverter device 1 in a state the power switch 121 is on. Note that, by turning on the power switch 121, a voltage is supplied from the battery pack 2 to the constant-voltage circuit 122, which generates driving voltage of the controller 19 to operate the controller 19. Further, in the present flowchart, the controller 19 obtains a current detected by the current detection resistor 17 (hereinafter, referred to as "detection current") in a preset sampling cycle.

First, the controller 19 sets the conduction angle to 90 degrees as an initial value (S101). The controller 19 then determines whether the detection current is larger than the preset value (5.8 A in the present embodiment) (S102).

If the detection current is larger than the preset value (S102: Yes), then the controller 19 determines whether the detection current is larger than the preset value over the first period (2 sec in the present embodiment) after a YES determination is made first in S102 (S103). Here, for example, the controller 19 can store a time point at which a YES determination is made first in S102, and determine whether all of the plurality of detection currents detected after the time point and before the first period elapses are larger than the above-mentioned preset value.

If the detection current is larger than the preset value over the first period (S103: Yes), the controller 19 increases the conduction angle to 150 degrees (S104).

Next, the controller 19 determines whether the detection current drops below the above-mentioned preset value, in order to determines whether grasses and the like stuck in a mowing section have been removed due to an increase in the conduction angle in S104 (S105).

If the detection current drops below the preset value (S105: Yes), it can be assumed that grasses and the like stuck in the mowing section have been removed due to an increase in the conduction angle. Hence, the controller 19 resets the conduction angle to 90 degrees which is the initial value (S107).

On the other hand, if the detection current does not drop below the preset value (S105: No), it is assumed that grasses and the like stuck in the mowing section have not been removed even with the increase in the conduction angle.

Hence, the controller 19 determines whether the detection current is larger than the above-mentioned preset value over the second period (3 sec in the present embodiment) after a No determination is made first in S105 (S106). Here, for example, the controller 19 can store a time point at which a NO determination is made first in S105, and determine whether all of the plurality of detection currents detected after the time point and before the second period elapses are larger than the above-mentioned preset value.

If the detection current is larger than the above-mentioned preset value over the second period (S106: Yes), grasses and the like stuck in the mowing section have not been removed. However, if the conduction angle is increased any longer, there is a possibility that the AC motor 31 is damaged. Accordingly, in this case, the conduction angle is reset to 90 degrees which is the initial value (S107).

Next, the controller 19 outputs, to the gate of the FET 132, the first PWM signal that is such a PWM signal that AC power having a target effective value (for example, 141) is outputted from the secondary side of the transformer 131 (S108). The controller 19 then determines whether an effective value of a voltage boosted by the transformer 131 is larger than the target effective value based on a voltage detected by the boost voltage detection unit 15 (S109).

If the boosted voltage is larger than the target effective value (S109: Yes), the controller 19 decreases a duty ratio of the FET 132 (S111). If the boosted voltage is smaller than or equal to the target effective value (S109: No), the controller 19 increases the duty ratio of the FET 132 (S110).

Subsequently, the controller 19 determines whether battery voltage of the battery pack 2 is less than a predetermined over-discharge voltage, based on voltage detected by the battery voltage detection unit 11 (S112). If the battery voltage is less than the predetermined over-discharge voltage (S112: Yes), the controller 19 determines that the battery pack 2 is in an over-discharge state and outputs the first PWM signal and the second PWM signal for stopping outputs to the AC motor 31 (S114). With this operation, operations of the booster circuit 13 and the inverter circuit 16 are stopped, and an output from the inverter device 1 to the AC motor 31 is stopped.

Further, if the battery voltage of the battery pack 2 is larger than or equal to the preset over-discharge voltage (S112: No), the controller 19 determines whether an over-discharge signal has been inputted from the battery pack 2 via an LD terminal (S113). If the over-discharge signal has been inputted (S113: Yes), the controller 19 determines that the battery pack 2 is in an over-discharge state, and outputs the first PWM signal and the second PWM signal for stopping outputs to the AC motor 31 (S114).

As described above, in the inverter device 1 according to the present embodiment, the ON period of the first set and the second set, that is, the conduction angle (duty cycle) is changed in accordance with the current detected by the current detection resistor 17. This can prevent a situation in which the AC motor 31 is locked and work is interrupted when the AC motor 31 has an overload temporarily, for example.

Specially, the inverter device 1 is suitable to a lawn mower and a hedge trimmer etc. that cut grass. If the electric power tool 3 cuts thick grass, load applied to the electric power tool 3 becomes larger temporarily. In such case, it becomes possible to cut the thick grass by temporarily increasing output of the electric power tool 3 without stopping the cutting operation.

Further, if the inverter device 1 is used in a drill, the inverter device 1 is more effective when loosening a rusting screw, for example. In such case, it becomes possible to fasten the rusting screw by temporarily increasing output of the electric power tool 3 at the beginning period of the fastening operation without stopping the fastening operation.

Next, an inverter device 10 according to a second embodiment will be described while referring to FIGS. 4 and 6. Like parts and components are designated by the same reference numerals as those shown in FIG. 1, and the descriptions are omitted.

The FET 132 can be damaged when an overcurrent flows into the FET 132. Thus, it is conceived that the controller 19 stops the ON/OFF operations of the FET 132 when determining, based on the current detected by the current detection resistor 17, that the overcurrent has occurred.

However, the current detection resistor 17 detects current flowing into not the FET 132 but the AC motor 31 or the inverter circuit 16 (FET 161-164). Hence, if the current flowing into the FET 132 exceeds an FET overcurrent threshold but the current flowing through the AC motor 31 or the inverter circuit 16 does not exceed a motor overcurrent threshold, power supply to the AC motor 31 is not stopped.

As a result, there is a possibility that overcurrent flows into the FET 132, thereby damaging the FET 132. That is, a current flowing into the AC motor 31 (the inverter circuit 16, a secondary-side current of the transformer 131) detected by the current detection resistor 17 is not necessarily proportional to a current flowing into the FET 132 (a primary side of the transformer 131). Hence, there is a possibility that the current detection resistor 17 cannot accurately detect (recognize) the current flowing into the FET 132 at the primary side of the transformer 131.

Figure 4:
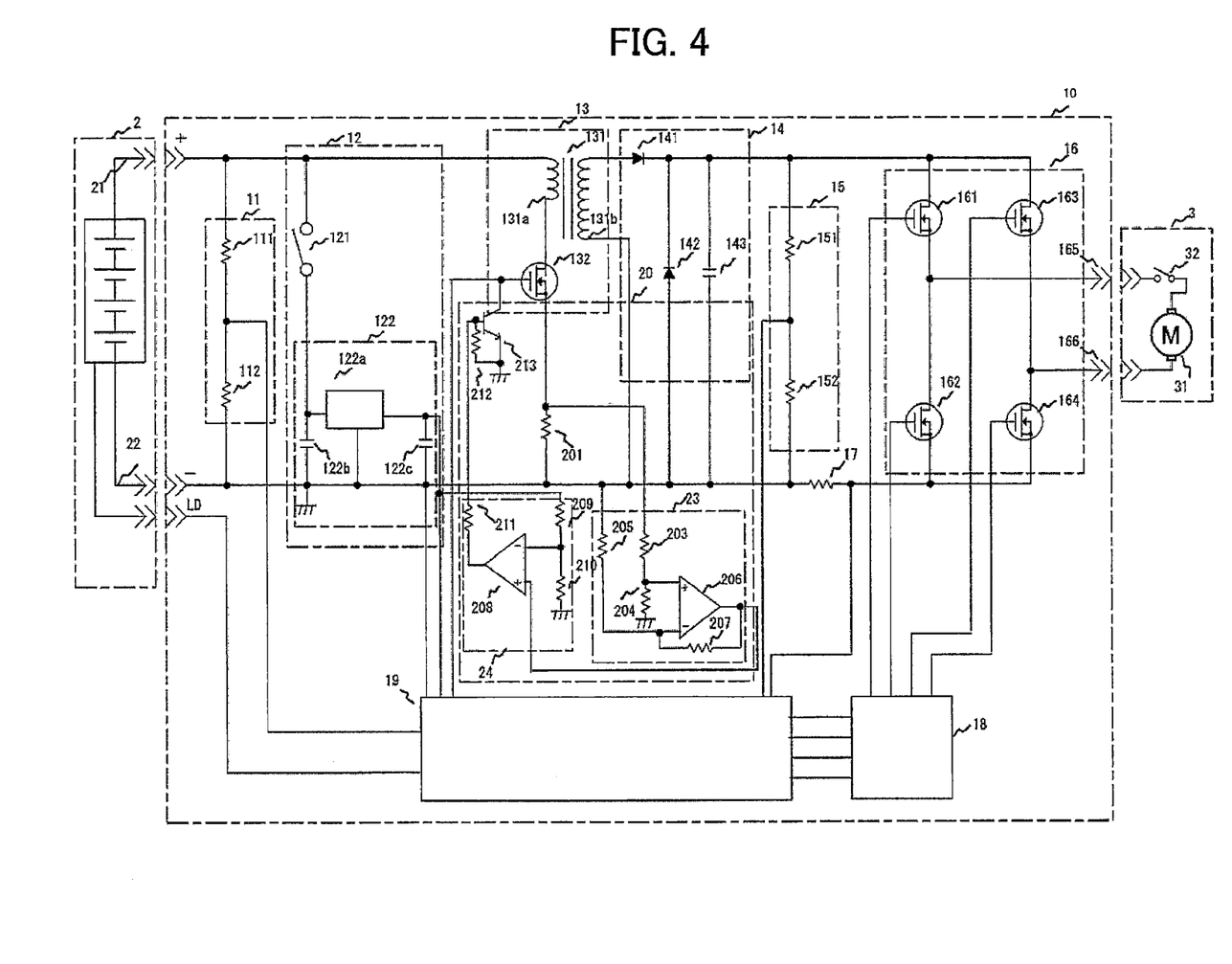
FIG. 4 is a circuit diagram of an inverter device according to a second embodiment of the present invention.

Thus, the inverter device 10 according to the present embodiment protects overcurrent in the FET 132 with an FET protecting unit (the first stopping unit of the present invention) 20, as shown in FIG. 4. The current detection resistor 17 serves as the second current detecting unit of the present invention. The controller 19 serves as the second stopping unit of the present invention.

The FET protecting unit 20 is an analog circuit including a current detecting resistor (the first current detecting unit of the present invention) 201, a differential amplifier circuit (the amplifier circuit of the present invention) 23, a comparison circuit 24, a resistor 212, and a transistor 213.

The current detecting resistor 201 is connected in series between a source of the FET 132 and a minus terminal of the battery pack 2. The source of the FET 132 is connected with the differential amplifier circuit 23. With this configuration, a current (voltage) flowing through the FET 132 is inputted to the differential amplifier circuit 23.

The differential amplifier circuit 23 includes an operational amplifier 206 and resistors 203-205 and 207. The differential amplifier circuit 23 amplifies a current (voltage) detected by the current detecting resistor 201, and outputs the detected current to the comparison circuit 24.

The comparison circuit 24 includes an operational amplifier 208 and resistors 209-211.

A divided voltage of a predetermined DC voltage (5V), which is outputted from a three-terminal regulator 122a, by the resistors 209 and 210 is inputted to a minus terminal of the operational amplifier 208 as an FET overcurrent threshold. On the other hand, an output from the differential amplifier circuit 23, that is, a voltage according to amplified detection current is inputted to a plus terminal of the operational amplifier 208.

The operational amplifier 208 compares the amplified detection current (voltage) with the FET overcurrent threshold, and outputs a low-level signal if the amplified detection current (voltage) is smaller than or equal to the FET overcurrent threshold and outputs a high-level signal if the amplified detection current (voltage) is larger than the FET overcurrent threshold.

An output terminal of the operational amplifier 208 is connected with a base of the transistor 213 via a resistor 211. A collector of the transistor 213 is connected with a gate of the FET 132, and an emitter is connected with the minus terminal 22 of the battery pack 2.

With this configuration, if a high-level signal is outputted from the operational amplifier 208, that is, if the current flowing into the FET 132 is larger than the FET overcurrent threshold, the transistor 213 becomes ON. As a result of that, even if a first PWM signal for turning on/off the FET 132 is inputted to the gate of the FET 132, the first PWM signal is made ineffective and the FET 132 maintains an OFF state.

In this way, in the inverter device 10 according to the present embodiment, if the current flowing into the FET 132 exceeds the FET overcurrent threshold, the FET protecting unit 20 stops ON/OFF operations of the FET 132 independently of the controller 19. Hence, the FET 132 can be reliably protected from overcurrent. That is, upon detecting overcurrent in the FET 132, the FET protecting unit 20 outputs an OFF signal of the FET 132 to the gate of the FET 132 independently of controls by the controller 19, thereby forcibly cutting off the FET 132.

Further, another configuration is also conceivable that ON/OFF operations of the FET 132 are stopped with the first PWM signal from the controller 19 if the current flowing through the FET 132 exceeds the FET overcurrent threshold. However, the controller 19 which is a digital circuit (for example, a microcomputer) has a slower processing speed than an analog circuit. Thus, in a case where a large current rapidly flows through the FET 132, for example, there is a possibility that the controller 19 cannot stop ON/OFF operations of the FET 132 instantaneously.

Hence, in the inverter device 10 according to the present embodiment, ON/OFF operations of the FET 132 are stopped by the FET protecting unit 20 which is an analog circuit, not by the controller 19 which is a digital circuit. With this configuration, even in a case where a large current rapidly flows into the FET 132, the ON/OFF operations of the FET 132 can be stopped instantaneously, and the FET 132 can be protected from overcurrent more reliably.

Further, at a startup of the inverter device 10, for example, a starting current that exceeds the FET overcurrent threshold flows. However, if the ON/OFF operations of the FET 132 are also stopped in this case, the AC motor 31 cannot start working. Hence, the inverter device 10 according to the present embodiment starts working the AC motor 31 by repeating the stoppage of the ON/OFF operations and the cancellation of the stoppage. Specifically, after ON/OFF operations of the FET 132 are stopped, the stoppage of ON/OFF operations is cancelled when a current flowing into the FET 132 drops to the overcurrent threshold or less.

The current flowing into the FET 132 (starting current) drops to the overcurrent threshold instantaneously after the ON/OFF operations of the FET 132 are stopped. Thus, the above-described cancellation of stoppage of ON/OFF operations is also performed instantaneously after the ON/OFF operations are stopped. On the other hand, immediately after the ON/OFF operations of the FET 132 are stopped, the AC motor 31 is still in a rotating state due to inertia. Accordingly, in the present embodiment, stoppage of the ON/OFF operations is cancelled in a state where the AC motor 31 is rotating due to inertia, and electric power is supplied to the AC motor 31 again. Because this operation is repeated at a startup of the inverter device 1 or the like, the AC motor 31 can be rotated gradually while protecting the FET 132 from overcurrent.

Next, operations of the controller 19 will be described while referring to the flowchart of FIG. 5.

Figure 5:
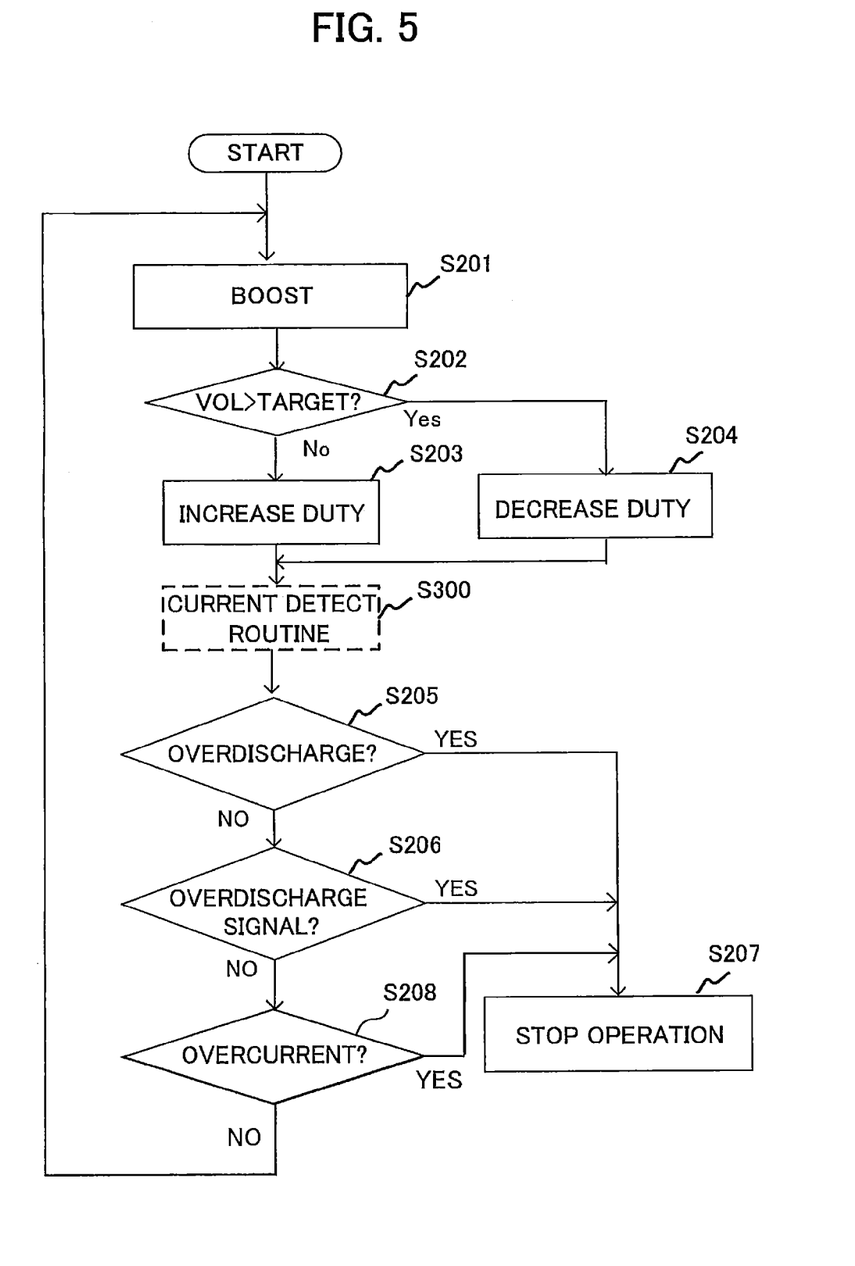
FIG. 5 is a flowchart of a control according to the second embodiment of the invention.
Figure 6:
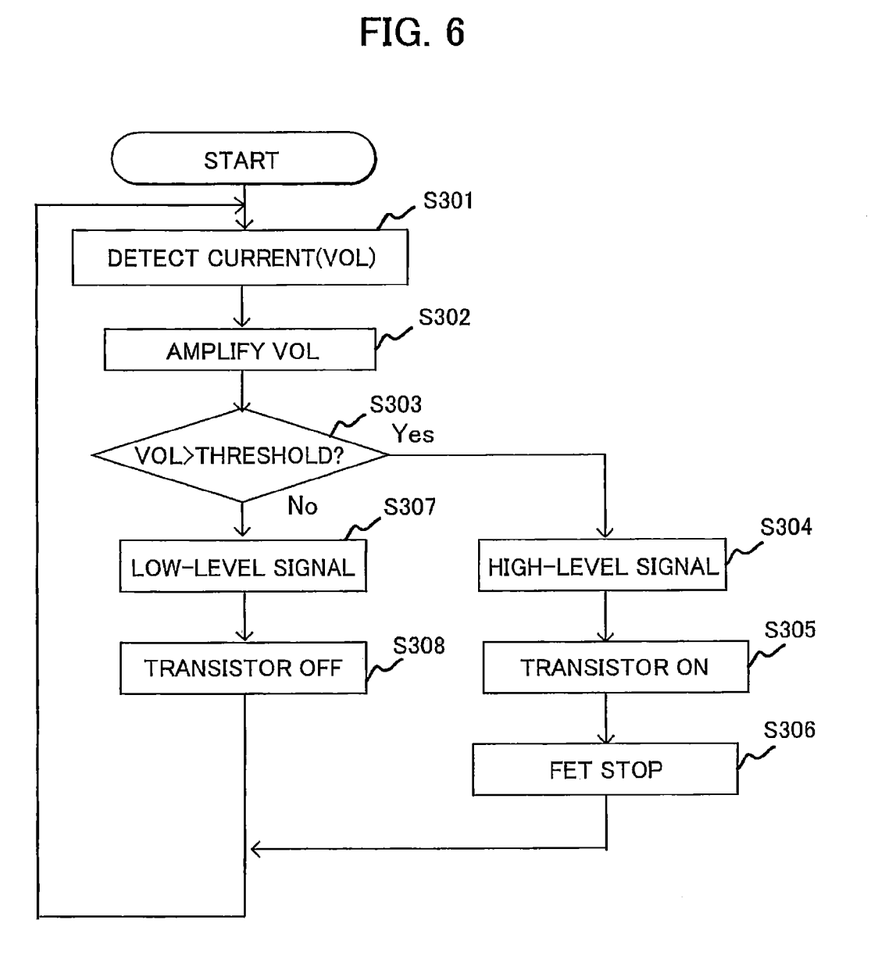
FIG. 6 is a flowchart of a current detecting routine according to the second embodiment of the invention.

The flowchart of FIG. 5 is started when the power switch 121 is turned on in a state where the battery pack 2 is mounted on the inverter device 1, or when the battery pack 2 is mounted onto the inverter device 1 in a state the power switch 121 is on. Note that, by turning on the power switch 121, a voltage is supplied from the battery pack 2 to the constant-voltage circuit 122, which generates driving voltage of the controller 19 to operate the controller 19.

First, the controller 19 outputs a first PWM signal to the gate of the FET 132, the first PWM signal being such that AC power having a target effective value (for example, 141V) is outputted from the secondary side of the transformer 131 (S201). The controller 19 then determines whether an effective value of voltage boosted by the transformer 131 is larger than the target effective value, based on the boost voltage detection unit 15 (S202).

If the boosted voltage is larger than the target effective value (S202: Yes), the controller 19 decreases a duty ratio of the FET 132 (S204). If the boosted voltage is smaller than or equal to the target effective value (S202: No), the controller 19 increases the duty ratio of the FET 132 (S203).

Subsequently, the FET protecting unit 20 executes a current detecting routine for stopping ON/OFF operations of the FET 132 (S300). The current detecting routine will be described with reference to FIG. 6.

Subsequently, the controller 19 determines whether a battery voltage of the battery pack 2 is less than a predetermined over-discharge voltage, based on voltage detected by the battery voltage detection unit 11 (S205). If the battery voltage is less than the preset over-discharge voltage (S205: Yes), the controller 19 determines that the battery pack 2 is in an over-discharge state and outputs a first PWM signal and a second PWM signal for stopping outputs to the AC motor 31 (S207). That is, outputs of the first and second PWM signals are stopped. With this operation, operations of the booster circuit 13 and the inverter circuit 16 are stopped, and an output from the inverter device 1 to the AC motor 31 is stopped.

Further, if the battery voltage of the battery pack 2 is larger than or equal to the preset over-discharge voltage (S205: No), the controller 19 determines whether an over-discharge signal has been inputted from the battery pack 2 via an LD terminal (S206). If the over-discharge signal has been inputted (S206: Yes), the controller 19 determines that the battery pack 2 (at least one battery cell) is in an over-discharge state, and outputs (stops) the first PWM signal and the second PWM signal for stopping outputs to the AC motor 31 (S207).

On the other hand, if the over-discharge signal has not been inputted (S206: No), the controller 19 determines whether a current detected by the current detection resistor 17 exceeds the motor overcurrent threshold or the overcurrent threshold of the FETs 161-164 of the inverter circuit 16 (S208). If the current exceeds the motor overcurrent threshold or the FET overcurrent threshold (S208: Yes), the controller 19 outputs (stops) the first PWM signal and the second PWM signal for stopping outputs to the AC motor 31 in order to protect the AC motor 31 or the inverter circuit 16 (FETs 161-164) from overcurrent (S207). On the other hand, if the current does not exceed the motor overcurrent threshold or the FET overcurrent threshold (S208: No), the controller 19 returns to S201.

Next, the current detecting routine, which is performed by the FET protecting unit 20 in S300 of FIG. 5 for stopping ON/OFF operations of the FET 132, will be described while referring to the flowchart of FIG. 6. Note that step S300 is executed independently of controls by the controller 19.

In the current detecting routine, first, a current flowing through the FET 132, that is, a voltage applied between both ends of the current detecting resistor 201 is detected (S301), and the voltage is amplified by the operational amplifier 206 (S302).

If the voltage amplified by the operational amplifier 206 is larger than a preset value (a divided voltage of 5V by the resistors 209 and 210), that is, if the current flowing into the FET 132 is larger than the FET overcurrent threshold (S303: Yes), a high-level signal is outputted from the operational amplifier 208 to the base of the transistor 213 (S304). With this operation, because the transistor 213 is tuned on (S305), the first PWM signal inputted to the gate of the FET 132 is made ineffective, and ON/OFF operations of the FET 132 are stopped (S306).

On the other hand, if the voltage amplified by the operational amplifier 206 is smaller than or equal to the preset value (S303: No), a low-level signal is outputted from the operational amplifier 208 to the base of the transistor 213 (S307). With this operation, because the transistor 213 is tuned off (S308), the ON/OFF operations of the FET 132 are not stopped and the FET 132 operates in accordance with the first PWM signal.

As described above, in the inverter device 10 according to the present embodiment, the current flowing into the FET 132 is detected and, if the current flowing through the FET 132 exceeds the FET overcurrent threshold, the FET protecting unit 20 stops the ON/OFF operations of the FET 132 independently of the controller 19. Thus, the FET 132 can be protected reliably from overcurrent.

While the power tool of the invention has been described in detail with reference to the above embodiments thereof, it would be apparent to those skilled in the art that various changes and modifications may be made therein without departing from the scope of the claims.

For example, in the first embodiment, conduction angles other than 90 degrees and 150 degrees may be used.

Further, in the first embodiment, if a current (voltage) detected by the current detection resistor 17 is larger than a second preset value that is larger than the preset value, the controller 19 may determine that it is in an overcurrent state, and may stop power supply to the AC motor 31 without changing the above-mentioned conduction angle.

Further, in the first embodiment, a load on the AC motor 31 may be determined based on another factor other than a current flowing into the AC motor 31, such as, a voltage etc. applied to the AC motor 31, for example.

Further, in the second embodiment, the current detecting routine may be executed in any position in the flowchart of FIG. 2, or may be executed in parallel with the flowchart of FIG. 2.

Further, in the second embodiment, after the ON/OFF operations of the FET 132 are stopped, the stoppage of ON/OFF operations is cancelled when a current flowing through the FET 132 drops to the overcurrent threshold or less. However, if stoppage and cancellation are repeated a predetermined times or more, it is assumed that the AC motor 31 is locked, not a startup of the inverter device 1. Accordingly, if stoppage and cancellation are continuously repeated a predetermined times or more, it is preferable that cancellation be not performed after that. In this case, output signals of the operational amplifier 208 can be monitored by the controller 19.

Further, in the first and second embodiments, the control of boosted voltage in S108-S111 in the flowchart of FIG. 3 and in S201-S204 in the flowchart of FIG. 5 and the detection of over-discharge in S112-S113 in the flowchart of FIG. 3 and in S205-S206 in the flowchart of FIG. 5 may also be executed in any position in the flowcharts of FIGS. 2 and 5, or may be executed in parallel with the flowcharts of FIGS. 2 and 5.

The invention claimed is:

1. An inverter device comprising:
an inverter circuit configured to perform ON/OFF operations with a preset duty cycle to convert a DC power into an AC power and output the AC power to an AC motor;
a load detecting unit configured to detect a load that has been applied to the motor; and
a controller configured to change a duty cycle of the ON/OFF operations, wherein the controller increases the duty cycle when the load detected by the load detecting unit is larger than a preset value.

2. The inverter device according to claim 1, wherein the duty cycle indicates an ON period in one cycle of the ON/OFF operations.

3. An electrical power tool comprising:
the inverter device according to claim 1; and
a motor driven with a power supplied from the inverter circuit.

4. An electrical power tool comprising:
the inverter device according to claim 1; and
the AC motor.

5. The inverter according to claim 1, wherein the controller increases the duty cycle when the load detected by the load detecting unit is larger than the preset value over a first period.

6. The inverter according to claim 1, wherein the controller decreases the duty cycle when a second period has elapsed since the controller increased the duty cycle.

7. The inverter according to claim 6, wherein the controller decreases the duty cycle when the load detected by the load detecting unit drops below the preset value before the second period has elapsed since the controller increased the duty cycle.

8. The inverter device according to claim 1 comprising:
a switching element configured to perform ON/OFF operations to convert a first DC voltage into a first AC voltage;
a rectifying/smoothing circuit configured to convert the first AC voltage into a second DC voltage;
an inverter circuit configured to convert the second DC voltage into a second AC voltage;
a first current detecting unit configured to detect a current flowing into the switching element; and a first stopping unit configured to stop the ON/OFF operations of the switching element based on the current detected by the first current detecting unit.

9. The inverter device according to claim 8, wherein the controller is configured to control the switching element and the inverter circuit,
wherein the first stopping unit stops the ON/OFF operations of the switching element independently of the controller.

10. The inverter device according to claim 9, further comprising:
a second current detecting unit configured to detect a current flowing into the inverter circuit; and
a second stopping unit configured to stop the ON/OFF operations of the switching element based on the current detected by the second current detecting unit.

11. The inverter device according to claim 10, wherein the first stopping unit is configured from an analogue circuit and the second stopping unit is the controller.

12. The inverter device according to claim 8, wherein the first stopping unit stops the ON/OFF operations of the switching element when the current detected by the first current detecting unit exceeds a preset value, and cancels the stoppage of the ON/OFF operations of the switching element when the current detected by the first current detecting unit drops below the preset value after the stoppage of the ON/OFF operations of the switching element.

13. The inverter device according to claim 12, wherein the switching element is configured from an FET having a gate, a source, and a drain, the FET performing the ON/OFF operations in accordance with a gate signal inputted into the gate, and
wherein the first stopping unit forcibly cuts out the gate signal when the current detected by the first current detecting unit exceeds the preset value.

14. The inverter device according to claim 13, wherein the first current detecting unit has a resistor connected to one of the source and the drain,
wherein the first stopping unit includes: an amplifier circuit configured to amplify a voltage difference between both ends of the resistor; and a comparison circuit configured to compare the amplified voltage difference with a preset voltage, and
wherein the comparison circuit outputs a block-out signal to the gate to stop the ON/OFF operations of the FET when the amplified voltage difference exceeds the preset voltage.

* * * * *